US010122842B2

(12) United States Patent
Lee et al.

(10) Patent No.: US 10,122,842 B2
(45) Date of Patent: Nov. 6, 2018

(54) WEB PAGE ACCESS METHOD AND WEB SERVER ACCESS METHOD (71) Applicant: Benple Inc., Seoul (KR)

(72) Inventors: Kyoung Jun Lee, Seoul (KR); Jung Ho Jun, Seoul (KR)

(73) Assignee: BENPLE INC., Seoul (KR)

( * ) Notice: Subject to any disclaimer, the term of this patent is extended or adjusted under 35 U.S.C. 154(b) by 0 days.

(21) Appl. No.: 15/617,372

(22) Filed: Jun. 8, 2017

(65) Prior Publication Data
US 2017/0272565 A1 Sep. 21, 2017

Related U.S. Application Data (62) Division of application No. 14/655,116, filed as application No. PCT/KR2014/009255 on Oct. 1, 2014, now Pat. No. 9,706,041.

(30) Foreign Application Priority Data

Jan. 8, 2014 (KR) .................. 10-2014-0002485
Jan. 23, 2014 (KR) .................. 10-2014-0008617
Mar. 6, 2014 (KR) .................. 10-2014-0026363

(51) Int. Cl.
H04W 4/00 (2018.01)
H04M 1/725 (2006.01)
(Continued)

(52) U.S. Cl.
CPC ........ *H04M 1/72561* (2013.01); *G06F 17/30* (2013.01); *G06F 17/30861* (2013.01);
(Continued)

(58) Field of Classification Search
CPC ....... H04W 4/00; H04W 12/08; H04W 4/023; H04W 40/244; H04W 76/021
(Continued)

(56) References Cited

U.S. PATENT DOCUMENTS 7,007,074 B2* 2/2006 Radwin .................. G06Q 30/02
705/14.54
7,925,780 B2* 4/2011 Philyaw ................ H04W 76/11
709/238
(Continued)

FOREIGN PATENT DOCUMENTS

KR 1020060079649 7/2006
KR 1020090005461 1/2009
(Continued)

OTHER PUBLICATIONS

International Search Report—PCT/KR2014/009255 dated Jan. 14, 2015.
Written Opinion—PCT/KR2014/009255 dated Jan. 14, 2015.

*Primary Examiner* — William D Cumming
(74) *Attorney, Agent, or Firm* — Cantor Colburn LLP (57) ABSTRACT A method of accessing a web page using a near field communication (NFC) tag is provided. The method includes receiving a tag ID from the NFC tag using an application program installed in a mobile terminal, the application program transmitting the tag ID to a first ID search engine, the application program receiving a uniform resource locator (URL) of a management system corresponding to the tag ID from the first ID search engine, the application program accessing the management system using the URL of the management system and requesting a URL of the web page from the management system, the application program receiving the URL of the web page from the management system, and the application program accessing the web page using the URL of the web page.

11 Claims, 9 Drawing Sheets (51) Int. Cl.
*H04W 4/80* (2018.01)
*G06F 17/30* (2006.01)
*H04L 29/08* (2006.01)

(52) U.S. Cl.
CPC ........ *G06F 17/30876* (2013.01); *H04L 67/02* (2013.01); *H04W 4/80* (2018.02); *H04M 1/7253* (2013.01); *H04M 2250/04* (2013.01)

(58) Field of Classification Search
USPC ...................................................... 455/456.3
See application file for complete search history.

(56) References Cited

U.S. PATENT DOCUMENTS

| | | | |
|---|---|---|---|
| 8,731,583 B2 | 5/2014 | Wengrovitz | |
| 8,817,712 B2* | 8/2014 | Shin | H04W 4/00 370/329 |
| 9,204,291 B2 | 12/2015 | Jackson et al. | |
| 9,485,404 B2 | 11/2016 | Hansen | |
| 9,706,041 B2* | 7/2017 | Lee | G06F 17/30 |
| 2002/0072981 A1 | 6/2002 | Park et al. | |
| 2003/0050863 A1* | 3/2003 | Radwin | G06Q 30/02 705/26.1 |
| 2004/0249983 A1 | 12/2004 | Bedner | |
| 2007/0156918 A1* | 7/2007 | Philyaw | H04W 76/11 709/237 |
| 2008/0291041 A1 | 11/2008 | Chkraborty | |
| 2009/0130641 A1 | 5/2009 | Mahesh et al. | |
| 2011/0161181 A1* | 6/2011 | Esteve Asensio | G06Q 30/02 705/14.73 |
| 2011/0165859 A1 | 7/2011 | Wengrovitz | |
| 2011/0182250 A1* | 7/2011 | Shin | H04W 4/00 370/329 |
| 2012/0019674 A1 | 1/2012 | Ohnishi et al. | |
| 2012/0054143 A1 | 3/2012 | Doig et al. | |
| 2012/0197981 A1 | 8/2012 | Chan | |
| 2013/0066849 A1 | 3/2013 | Saeki | |
| 2013/0102248 A1 | 4/2013 | Jay et al. | |
| 2014/0070919 A1 | 3/2014 | Jackson et al. | |
| 2014/0106735 A1 | 4/2014 | Jackson et al. | |
| 2014/0279045 A1 | 9/2014 | Shottan | |
| 2014/0337434 A1 | 11/2014 | Hansen | |
| 2014/0344036 A1 | 11/2014 | Serad | |
| 2014/0354808 A1 | 12/2014 | Hansen | |
| 2015/0312164 A1* | 10/2015 | Yasunaga | H04W 12/08 709/203 |
| 2016/0094946 A1* | 3/2016 | Keithley | H04W 4/023 455/456.3 |
| 2016/0277999 A1* | 9/2016 | Graves | H04W 40/244 |
| 2016/0309015 A1* | 10/2016 | Lee | G06F 17/30 |
| 2017/0272565 A1* | 9/2017 | Lee | G06F 17/30 |

FOREIGN PATENT DOCUMENTS

| | | |
|---|---|---|
| KR | 101281953 | 8/2013 |
| KR | 1020130101199 | 9/2013 |

* cited by examiner

WEB PAGE ACCESS METHOD AND WEB SERVER ACCESS METHOD

CROSS-REFERENCE TO RELATED APPLICATIONS

This application is a divisional application of U.S. Ser. No. 14/655,116, filed on Jun. 24, 2015, which is a national entry of PCT Application No. PCT/KR2014/009255 filed on Oct. 1, 2014, which claims priority to and the benefit of Korean Application No. 10-2014-0002485 filed on Jan. 8, 2014; Korean Application No. 10-2014-0008617 filed on Jan. 23, 2014 and Korean Application No. 10-2014-0026363 filed on Mar. 6, 2014, in the Korean Patent Office, the entire contents of which are incorporated herein by reference.

TECHNICAL FIELD

The present invention relates to a method of accessing a web server, and more particularly, to a method of access a web server using a near field communication (NFC) tag or a beacon.

BACKGROUND ART

NFC (near field communication) is one of electronic tag (or a radio frequency tag) techniques. It is contactless communication technology using a frequency band of 13.56 MHz.

With the development of smart phones, smart phones having an NFC function are widely used. In particular, when a smart phone having the NFC function is brought close to an NFC tag in which a URL (uniform resource locator) involved with a certain web site is stored, the NFC tag directly provide the URL for the smart phone.

It is inconvenient for users to install and execute a special application including an NFC write function in their smart phones in order to change a certain URL that has already been written to an NFC tag. Moreover, when a URL of a web site corresponding to a first URL stored in an NFC tag is changed into a second URL, the NFC tag itself needs to be replaced with another NFC tag storing the second URL.

A beacon is a BLUETOOTH low energy (BLE) device that is able to access a mobile application program installed in a smart phone when a client carrying the smart phone enters a store. For instance, a beacon may be implemented as a small BLUETOOTH transceiver in a USB memory shape. When the beacon is inserted into a USB port of a personal computer or a power point in the store, the installation of the beacon is completed. A BLE-based beacon has a long transmission distance from 10 meters to 50 meters as compared to NFC and thus combines a location-based marketing platform and payment service. A beacon also directly provides a URL of a certain web site for a smart phone, and therefore, the beacon needs to be replaced when the web site is changed to another web site.

SUMMARY OF THE INVENTION

The present inventive provides a web server access method by which a web site involved with a near field communication (NFC) tag or a beacon is accessed without the NFC tag or the beacon changed even when the web site is changed.

According to an aspect of the present invention, there is provided a method of accessing a web page using a near field communication (NFC) tag. The method includes receiving a tag ID from the NFC tag using an application program installed in a mobile terminal, the application program transmitting the tag ID to a first ID search engine, the application program receiving a uniform resource locator (URL) of a management system corresponding to the tag ID from the first ID search engine, the application program accessing the management system using the URL of the management system and requesting a URL of the web page from the management system, the application program receiving the URL of the web page from the management system, and the application program accessing the web page using the URL of the web page. The requesting the URL of the web page may include transmitting the tag ID to the management system together with the request.

The transmitting the tag ID to the first ID search engine may be performed when the application program transmits the tag ID to a second ID search engine and then does not receive the URL of the management system corresponding to the tag ID from the second ID search engine.

According to another aspect of the present invention, there is provided a method of accessing a web page using an NFC tag. The method includes receiving a URL of a management system from the NFC tag using an application program installed in a mobile terminal, the application program accessing the management system using the URL of the management system and requesting a URL of the web page from the management system, the application program receiving the URL of the web page from the management system, and the application program accessing the web page using the URL of the web page.

When the application program receives both a tag ID and the URL of the management system from the NFC tag, the requesting the URL of the web page may include transmitting the tag ID to the management system together with the request.

According to still another aspect of the present invention, there is provided a method of accessing a web page using a beacon. The method includes receiving a beacon ID from the beacon using an application program installed in a mobile terminal, the application program transmitting the beacon ID to a first ID search engine, the application program receiving a URL of a management system corresponding to the beacon ID from the first ID search engine; the application program accessing the management system using the URL of the management system and requesting a URL of the web page from the management system; the application program receiving the URL of the web page from the management system; and the application program accessing the web page using the URL of the web page.

The requesting the URL of the web page may include transmitting the tag ID to the management system together with the request.

The transmitting the beacon ID to the first ID search engine may be performed when the application program transmits the beacon ID to a second ID search engine and then does not receive the URL of the management system corresponding to the beacon ID from the second ID search engine.

According to even another aspect of the present invention, there is provided a method of accessing a web page using a beacon. The method includes receiving a URL of a management system from the beacon using an application program installed in a mobile terminal, the application program accessing the management system using the URL of the management system and requesting a URL of the web page from the management system, the application program receiving the URL of the web page from the management system, and the application program accessing the web page using the URL of the web page.

When the application program receives both a beacon ID and the URL of the management system from the beacon, the requesting the URL of the web page may include transmitting the beacon ID to the management system together with the request.

According to yet another aspect of the present invention, there is provided a computer readable recording medium for recording a computer program for executing the method of accessing the web page.

According to a further aspect of the present invention, there is provided a method of accessing a web server using a mobile application. The method includes receiving a first URL from a tag using the mobile application installed in a mobile terminal, accessing a content management system corresponding to the first URL using the mobile application, receiving a second URL from the content management system using the mobile application, and accessing a first web server corresponding to the second URL using the mobile application.

The method may further include receiving the first URL from a tag the same as the tag using the mobile application after the second URL is changed into a third URL by the content management system, accessing the content management system corresponding to the first URL using the mobile application, receiving the third URL from the content management system using the mobile application, and accessing a second web server corresponding to the third URL using the mobile application. The mobile application may be executed every time the first URL is received.

The method may further include receiving a beacon signal including a beacon ID from a beacon using the mobile application, calculating a distance between the beacon and the mobile terminal based on strength of the beacon signal using the mobile application, transmitting the beacon ID and the calculated distance to a beacon ID directory server using the mobile application, receiving an intermediate URL from the beacon ID directory server using the mobile application, accessing the content management system corresponding to the intermediate URL using the mobile application, receiving a final destination URL from the content management system using the mobile application, and accessing a third web server corresponding to the final destination URL using the mobile application. The intermediate URL may be selected based on the beacon ID and the calculated distance.

The mobile application may be executed in response to the beacon signal.

According to a still further aspect of the present invention, there is provided a method of accessing a web server using a mobile application. The method includes receiving a beacon signal including a beacon ID from a beacon using the mobile application installed in a mobile terminal, calculating a distance between the beacon and the mobile terminal based on strength of the beacon signal using the mobile application, transmitting the beacon ID and the calculated distance to a beacon ID directory server using the mobile application, receiving an intermediate URL from the beacon ID directory server using the mobile application, accessing a content management system corresponding to the intermediate URL using the mobile application, receiving a final destination URL from the content management system using the mobile application, and accessing a first web server corresponding to the final destination URL using the mobile application. The intermediate URL may be selected based on the beacon ID and the calculated distance.

The method may further include receiving a first URL from a tag using the mobile application, accessing the content management system corresponding to the first URL using the mobile application, receiving a second URL from the content management system using the mobile application, and accessing a second web server corresponding to the second URL using the mobile application.

According to an even further aspect of the present invention, there is provided a computer readable recording medium for recording a computer program for executing the method of accessing the web server using the mobile application.

Embodiments of the present invention allow a web site involved with an NFC tag or a beacon to be accessed without the NFC tag or the beacon changed even when the web site is changed.

BEST MODE FOR CARRYING OUT THE INVENTION

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings. Like reference numerals in the drawings denote like elements.

An application (i.e., an application program or a mobile application program) which will be described below is defined as an application that can perform at least one method among various web page access methods which will be described with reference to FIGS. 1 through 6.

Figure 1:
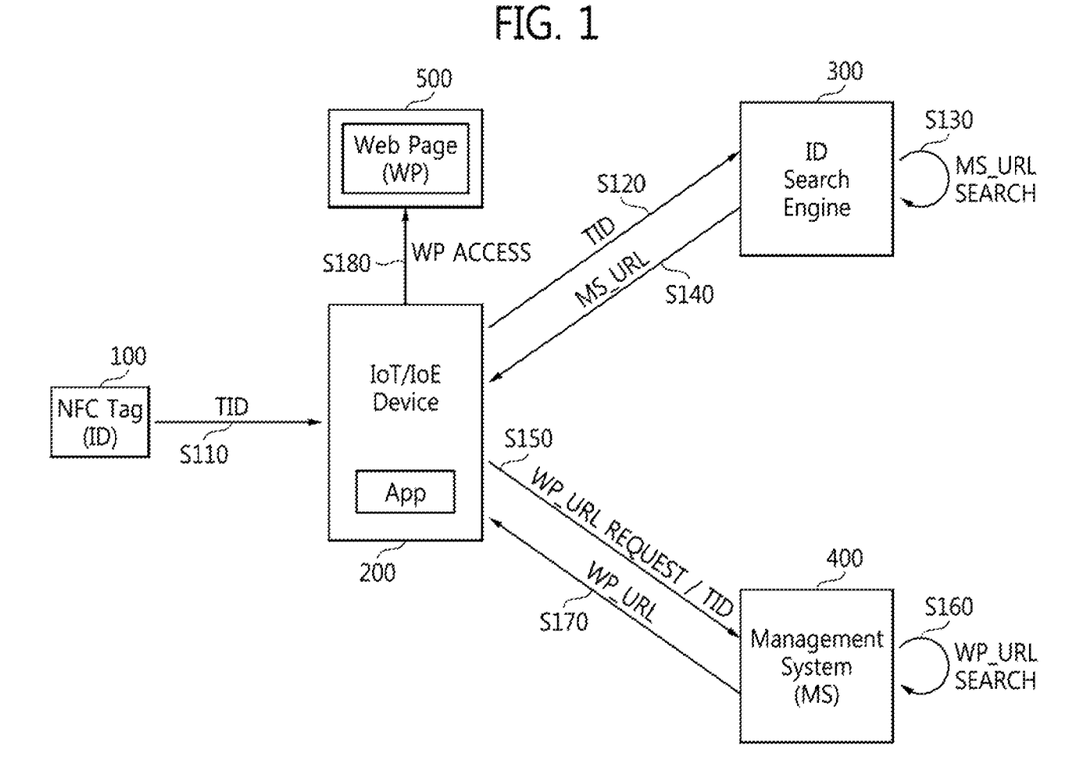
FIG. 1 is a schematic block diagram of a system for accessing a web page using a near field communication (NFC) tag according to some embodiments of the present invention.

FIG. 1 is a schematic block diagram of a system for accessing a web page using a near field communication (NFC) tag according to some embodiments of the present invention. Referring to FIG. 1, the system includes an NFC tag 100, a mobile terminal 200, a first ID search engine 300, a management system (MS) 400, and a web server 500.

The mobile terminal 200 may be implemented as an internet of things (IoT) device or an internet of everything (IoE) device.

The NFC tag 100 and mobile terminal 200 may include a transceiver module for NFC. A tag ID is stored in the NFC tag 100. For instance, the mobile terminal 200 may be implemented as a laptop computer, a smartphone, a tablet PC, a mobile internet device (MID), an internet tablet, a digital camera, or a wearable computer.

When a user scans, tags, or contactlessly touches the NFC tag 100 using an application program App installed in the mobile terminal 200, the NFC tag 100 transmits an NFC tag ID TID to the mobile terminal 200 through NFC in operation S110.

The application program App transmits the NFC tag ID TID to the first ID search engine 300 through a wired network, a wireless network, or Wi-Fi in operation S120. In other words, the transceiver module implemented in the mobile terminal 200 transmits the NFC tag ID TID to the first ID search engine 300 according to the control of the application program App in operation S120.

The first ID search engine 300 receives the NFC tag ID TID and searches for a uniform resource locator (URL) MS_URL of the management system 400 corresponding to the NFC tag ID TID in operation S130 and transmits the URL MS_URL of the management system 400 to the mobile terminal 200 in operation S140. Here, a URL is a rule for specifying the location of a resource on a network. Any resource on a computer network as well as a web site address can be referred to using a URL. Accordingly, a protocol agreeing with a URL is needed to access a web site address and the web site address should be accessed using the protocol.

The application program App may access the management system 400 using the URL MS_URL of the management system 400, which has been transmitted from the first ID search engine 300, and may request an address (e.g., a URL WP_URL) of a web page WP from the management system 400 in operation S150. Alternatively, the application program App may transmit the NFC tag ID TID to the management system 400 together with the request in operation S150. The transceiver module implemented in the mobile terminal 200 may transmit data to or receive data from the management system 400 according to the control of the application program App.

The management system 400 may search for the URL WP_URL of the web page WP in response to the request in operation S160. Alternatively, when the application program App transmits the NFC tag ID TID together with the request, the management system 400 may search for the URL WP_URL of the web page WP in response to the request and the NFC tag ID TID in operation S160.

The management system 400 transmits the URL WP_URL of the web page WP to the application program App in the mobile terminal 200 in operation S170. The application program App may access the web server 500 or a web site that manages the web page WP using the URL WP_URL of the web page WP in operation S180.

Figure 2:
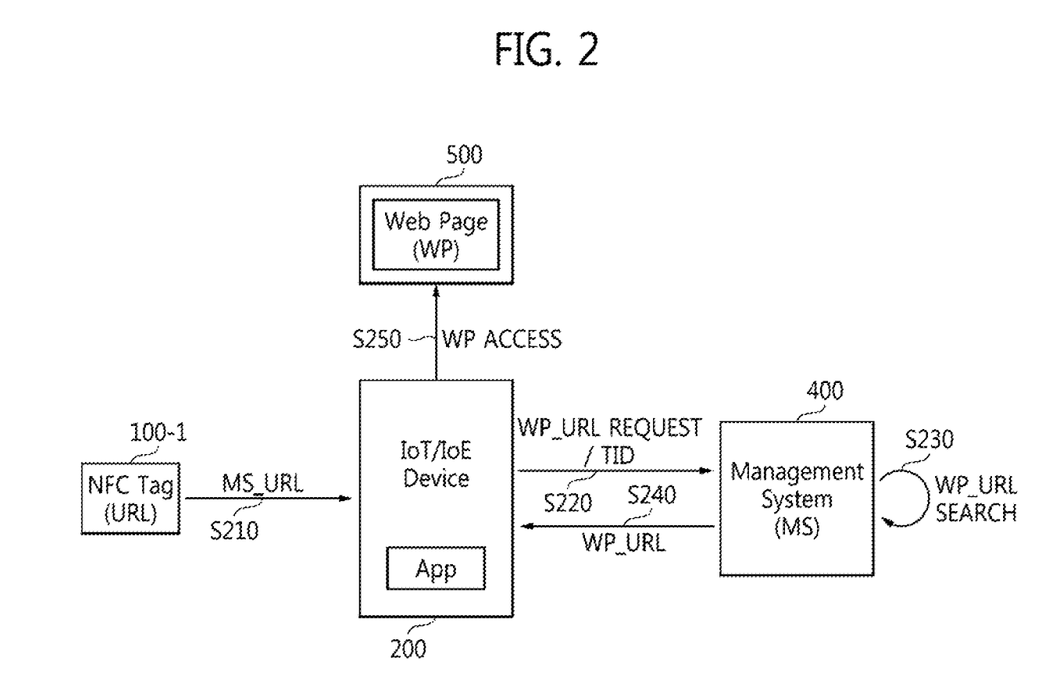
FIG. 2 is a schematic block diagram of a system for accessing a web page using an NFC tag according to other embodiments of the present invention.

FIG. 2 is a schematic block diagram of a system for accessing a web page using an NFC tag according to other embodiments of the present invention. Referring to FIG. 2, the system includes an NFC tag 100-1, the mobile terminal 200, the management system 400, and the web server 500. The NFC tag 100-1 and mobile terminal 200 may include a transceiver module for NFC. A URL of the management system 400 is stored in the NFC tag 100-1.

When a user scans, tags, or contactlessly touches the NFC tag 100-1 using the application program App installed in the mobile terminal 200, the NFC tag 100-1 may transmit the URL MS_URL of the management system 400 to the mobile terminal 200 through NFC or may transmit both the URL MS_URL of the management system 400 and the NFC tag ID TID to the mobile terminal 200 through NFC in operation S210.

The application program App may access the management system 400 using the URL MS_URL of the management system 400, which has been transmitted from the NFC tag 100-1, and may request the management system 400 to transmit the URL WP_URL of the web page WP in operation S220. Alternatively, the application program App may transmit the NFC tag ID TID to the management system 400 together with the request in operation S220.

The management system 400 may search for the URL WP_URL of the web page WP in response to the request in operation S230. Alternatively, when the application program App transmits the NFC tag ID TID together with the request, the management system 400 may search for the URL WP_URL of the web page WP in response to the request and the NFC tag ID TID in operation S230. The management system 400 may transmit the URL WP_URL of the web page WP to the application program App in operation S240. The application program App may access the web server 500 or a web site that manages the web page WP using the URL WP_URL of the web page WP in operation S250.

Figure 3:
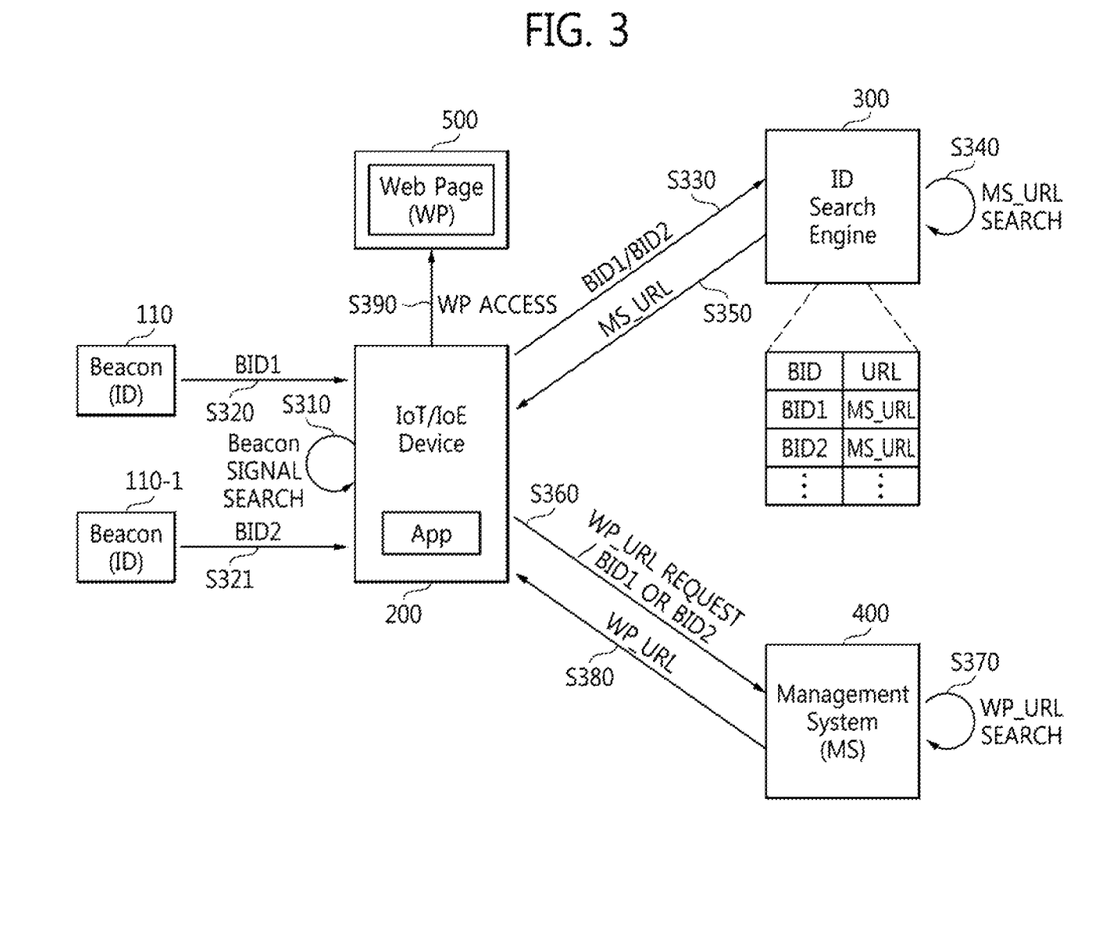
FIG. 3 is a schematic block diagram of a system for accessing a web page using a beacon according to still other embodiments of the present invention.

FIG. 3 is a schematic block diagram of a system for accessing a web page using a beacon according to still other embodiments of the present invention. Referring to FIG. 3, the system includes at least one beacon 110 and/or 110-1, the mobile terminal 200, the first ID search engine 300, the management system 400, and the web server 500.

Here, a beacon generally refers to hardware that provides information for an IoT device or an IoE device by way of broadcasting using various types of communication technology including BLUETOOTH or software that performs the same function as the hardware. The beacon may also refer to a device for data communication using BLUETOOTH low energy (BLE). For instance, unlike NFC which requires a mobile terminal (e.g., a smartphone) to be tagged in a close proximity to an NFC module, the beacon allows data to be transmitted to the mobile terminal even when the mobile terminal just passes by a place where the beacon is installed.

For instance, the beacon refers to hardware or hardware module for communication using wireless personal area network (WPAN) or infrared data association (IrDA). WPAN includes BLUETOOTH, ZIGBEE, or ultra wide band (UWB).

The mobile terminal 200 is a wireless communication terminal which can communicate with the at least one beacon 110 and/or 110-1. As described above, the mobile terminal 200 may be implemented as an IoT device, an IoE device, a smartphone, a tablet PC, a MID, an internet tablet, a digital camera, or a wearable computer.

The at least one beacon 110 and/or 110-1 and the mobile terminal 200 may include a transceiver module for communication. A beacon ID BID1 or BID2 is stored in each beacon 110 or 110-1.

The application program App installed in the mobile terminal 200 may search for a beacon signal output from the at least one beacon 110 and/or 110-1 in operation S310. Operation S310 may not be performed according to the configuration of the application program App or the configuration of a user of the mobile terminal 200.

Each beacon 110 or 110-1 transmits the beacon ID BID1 or BID2 to the mobile terminal 200 in operation S320 or S321. The application program App may transmit at least one of the beacon IDs BID1 and BID2 to the first ID search engine 300 through a wired or wireless network in operation S330. In other words, the application program App may put a query to the first ID search engine 300 about the existence of each beacon ID BID1 or BID2.

The first ID search engine 300 may receive the beacon ID BID1 or BID2 and searches for the URL MS_URL of the management system 400 corresponding to the beacon ID BID1 or BID2 in operation S340 and may transmit the URL MS_URL of the management system 400 to the mobile terminal 200 in operation S350.

The application program App may access the management system 400 using the URL MS_URL of the management system 400, which has been transmitted from the first ID search engine 300, and may request the management system 400 to transmit the URL WP_URL of the web page WP in operation S360. Alternatively, the application program App may transmit the beacon ID BID1 or BID2 to the management system 400 together with the request in operation S360.

The management system 400 searches for the URL WP_URL of the web page WP in response to the request in operation S370. Alternatively, when the application program App transmits the beacon ID BID1 or BID2 together with the request, the management system 400 may search for the URL WP_URL of the web page WP in response to the request and the beacon ID BID1 or BID2 in operation S370.

The management system 400 transmits the URL WP_URL of the web page WP to the application program App in the mobile terminal 200 in operation S380. The application program App may access the web server 500 or a web site that manages the web page WP using the URL WP_URL of the web page WP in operation S390.

Figure 4:
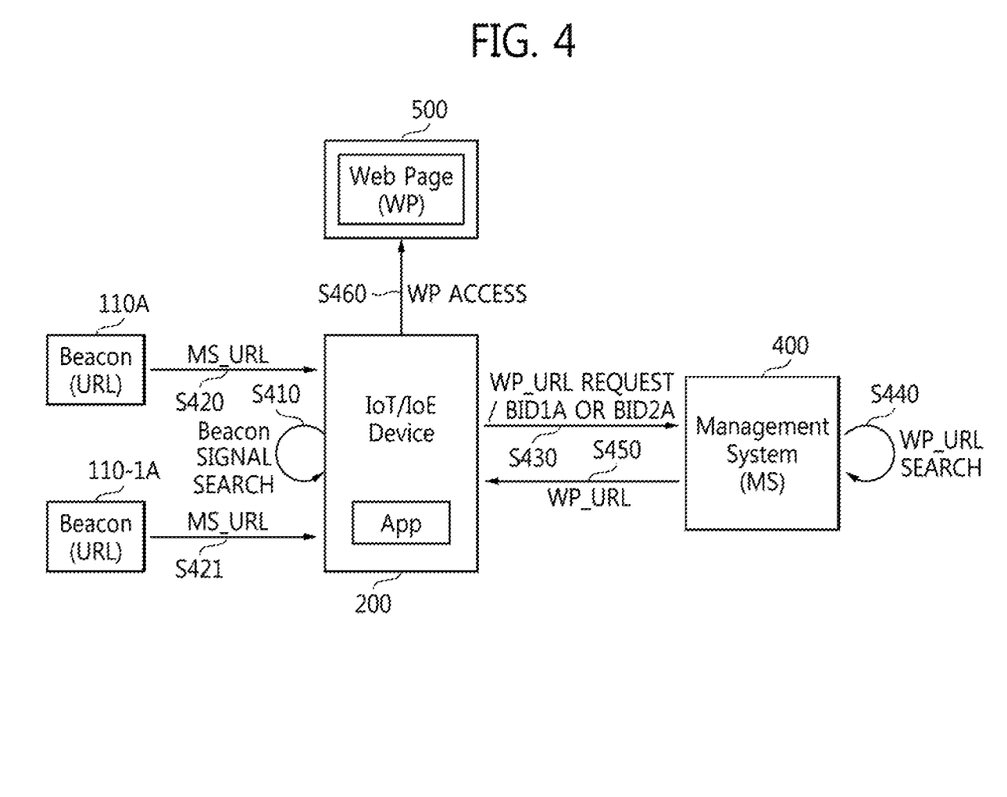
FIG. 4 is a schematic block diagram of a system for accessing a web page using a beacon according to even other embodiments of the present invention.

FIG. 4 is a schematic block diagram of a system for accessing a web page using a beacon according to even other embodiments of the present invention. Referring to FIG. 4, the system includes at least one beacon 110A and/or 110-1A, the mobile terminal 200, the management system 400, and the web server 500.

The application program App installed in the mobile terminal 200 may search for a beacon signal output from the at least one beacon 110A and/or 110-1A in operation S410.

Operation S410 may not be performed according to the configuration of the application program App or the configuration of a user of the mobile terminal 200. Each beacon 110A and/or 110-1A may transmit the URL MS_URL of the management system 400 to the mobile terminal 200 or may transmit a beacon ID BID1A or BID2A together with the URL MS_URL of the management system 400 to the mobile terminal 200 in operation S420 or S421.

The application program App may access the management system 400 using the URL MS_URL of the management system 400, which has been transmitted from the beacon 110A and/or 110-1A, and may request the management system 400 to transmit the URL WP_URL of the web page WP in operation S430. Alternatively, the application program App may transmit the beacon ID BID1A or BID2A to the management system 400 together with the request in operation S430.

The management system 400 searches for the URL WP_URL of the web page WP in response to the request in operation S440. Alternatively, when the application program App transmits the beacon ID BID1A or BID2A together with the request, the management system 400 may search for the URL WP_URL of the web page WP in response to the request and the beacon ID BID1A or BID2A in operation S440.

For instance, the management system 400 may access a database that stores URLs of web pages managed by beacon IDs.

The management system 400 transmits the URL WP_URL of the web page WP to the application program App in the mobile terminal 200 in operation S450. The application program App may access the web server 500 or a web site that manages the web page WP using the URL WP_URL of the web page WP in operation S460.

Figure 5:
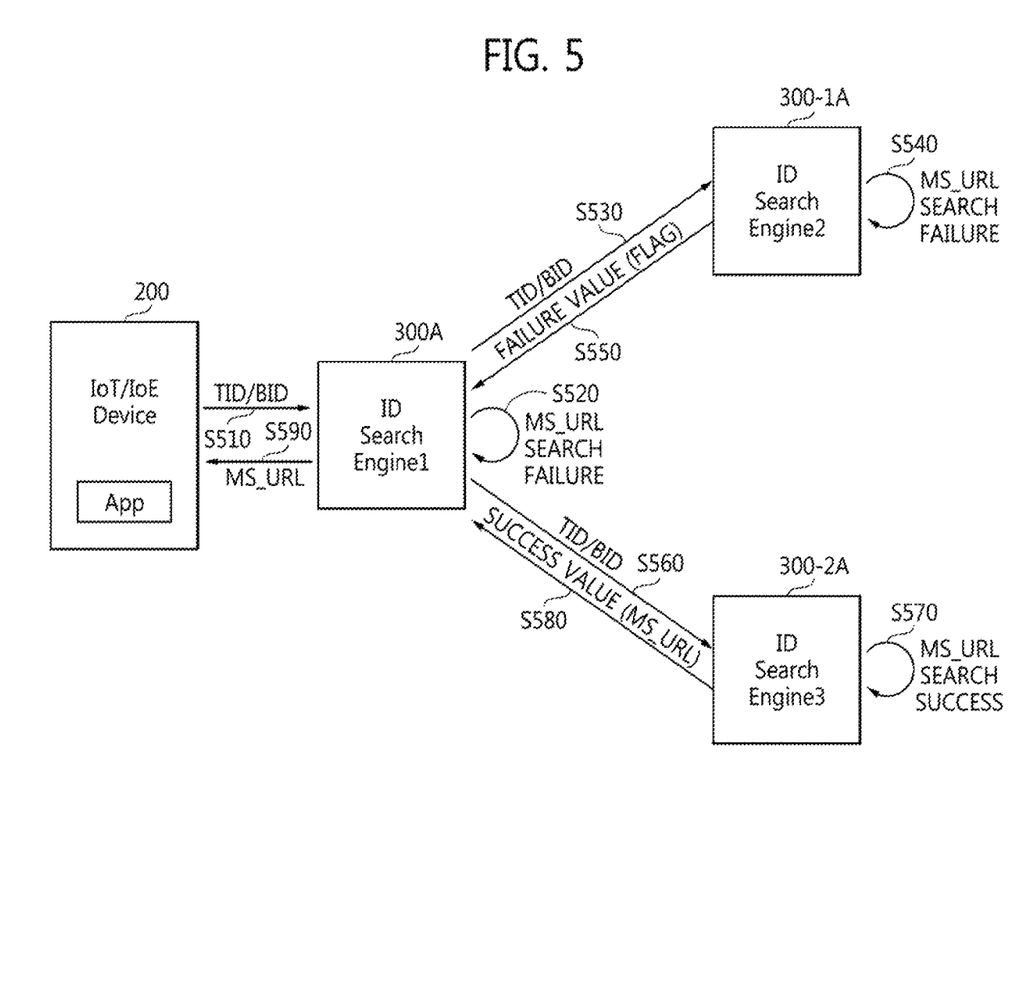
FIG. 5 is a schematic block diagram of a system according to yet other embodiments of the present invention.

FIG. 5 is a schematic block diagram of a system according to yet other embodiments of the present invention. Referring to FIG. 5, the system includes the mobile terminal 200, a first ID search engine 300A, a second ID search engine 300-1A, and a third ID search engine 300-2A.

A method of operating the system when the first ID search engine 300 or 300A (collectively denoted by 300A) fails in searching for the URL MS_URL of the management system 400 through search will be described reference to FIGS. 1, 3, and 5 below.

The application program App installed in the mobile terminal 200 transmits the NFC tag ID TID or the beacon ID BID1 or BID2 (collectively denoted by BID) to the first ID search engine 300A in operation S120, S330, or S510. The first ID search engine 300A searches for the URL MS_URL of the management system 400 corresponding to the NFC tag ID TID or the beacon ID BID in operation S130, S340, or S520.

When the first ID search engine 300A fails in searching for the URL MS_URL of the management system 400 corresponding to the NFC tag ID TID or the beacon ID BID, first ID search engine 300A transmits the NFC tag ID TID or the beacon ID BID to the second ID search engine 300-1A in operation S530. The second ID search engine 300-1A searches for the URL MS_URL of the management system 400 corresponding to the NFC tag ID TID or the beacon ID BID transmitted from the first ID search engine 300A.

When the second ID search engine 300-1A fails in searching for the URL MS_URL of the management system 400 corresponding to the NFC tag ID TID or the beacon ID BID, the second ID search engine 300-1A sends a search result, i.e., a failure value (e.g., a flag) indicating a failure to the first ID search engine 300A in operation S550. The first ID search engine 300A transmits the NFC tag ID TID or the beacon ID BID to the third ID search engine 300-2A in response to the failure value in operation S560.

The third ID search engine 300-2A searches for the URL MS_URL of the management system 400 corresponding to the NFC tag ID TID or the beacon ID BID transmitted from the first ID search engine 300A in operation S570. When the third ID search engine 300-2A gets (i.e., succeeds in searching for) the URL MS_URL of the management system 400 corresponding to the NFC tag ID TID or the beacon ID BID, the third ID search engine 300-2A sends a search result, i.e., a success value (e.g., the URL MS_URL of the management system 400) to the first ID search engine 300A in operation S580.

The first ID search engine 300A may transmit the URL MS_URL of the management system 400 to the application program App installed in the mobile terminal 200 in operation S590.

As described above with reference to FIG. 1 or 3, the application program App may acquire the URL WP_URL of the web page WP and shift to the web server 500 or a web site that manages the web page WP. For instance, when the second ID search engine 300-1A gets (i.e., succeeds in searching for) the URL MS_URL of the management system 400 corresponding to the NFC tag ID TID or the beacon ID BID, the second ID search engine 300-1A may send a search result, i.e., a success value (e.g., the URL MS_URL of the management system 400) to the first ID search engine 300A.

Although three ID search engines 300A, 300-1A, and 300-2A are illustrated in FIG. 5 for convenience' sake of the description, the system illustrated in FIG. 5 may use two ID search engines or at least four ID search engines.

Figure 6:
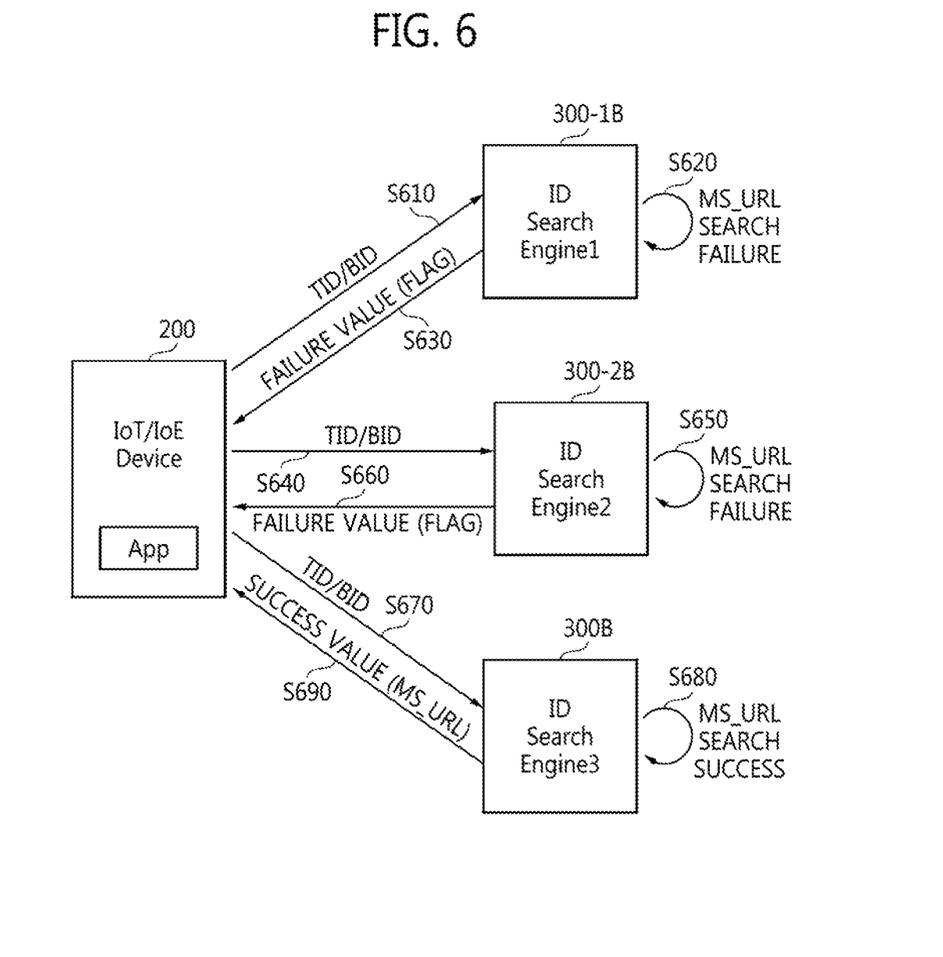
FIG. 6 is a schematic block diagram of a system according to further embodiments of the present invention.

FIG. 6 is a schematic block diagram of a system according to further embodiments of the present invention. Referring to FIG. 6, the system includes the mobile terminal 200, a first ID search engine 300-1B, a second ID search engine 300-2B, and a third ID search engine 300-B

Referring to FIGS. 1, 3, and 6, the application program App installed in the mobile terminal 200 transmits the NFC tag ID TID or the beacon ID BID1 or BID2 (collectively denoted by BID) to the first ID search engine 300-1B in operation S610. The first ID search engine 300-1B searches for the URL MS_URL of the management system 400 corresponding to the NFC tag ID TID or the beacon ID BID in operation S620.

When the first ID search engine 300-1B does not get the URL MS_URL of the management system 400 corresponding to the NFC tag ID TID or the beacon ID BID (that is, when it fails in searching), the first ID search engine 300-1B transmits a search result, i.e., a failure value (e.g., a flag) indicating failure to the application program App in operation S630.

In response to the failure value (e.g., the flag) transmitted from the first ID search engine 300-1B, the application program App transmits the NFC tag ID TID or the beacon ID BID to the second ID search engine 300-2B in operation S640. The second ID search engine 300-2B searches for the URL MS_URL of the management system 400 corresponding to the NFC tag ID TID or the beacon ID BID in operation S650.

When the second ID search engine 300-2B does not get the URL MS_URL of the management system 400 corresponding to the NFC tag ID TID or the beacon ID BID (that is, when it fails in searching), the second ID search engine 300-2B transmits a search result, i.e., a failure value (e.g., a flag) indicating failure to the application program App in operation S660.

In response to the failure value (e.g., the flag) transmitted from the second ID search engine 300-2B, the application program App transmits the NFC tag ID TID or the beacon ID BID to the third ID search engine 300 or 300B in operation S670. The third ID search engine 300 or 300B searches for the URL MS_URL of the management system 400 corresponding to the NFC tag ID TID or the beacon ID BID in operation S680.

When the third ID search engine 300 or 300B gets (i.e., succeeds in searching for) the URL MS_URL of the management system 400 corresponding to the NFC tag ID TID or the beacon ID BID, the third ID search engine 300 or 300B sends a search result, i.e., a success value (e.g., the URL MS_URL of the management system 400) to the application program App in operation S690.

As described above with reference to FIG. 1 or 3, the application program App may access the web server 500 or a web site that manages the web page WP using the URL MS_URL of the management system 400, as shown in FIG. 1 or 3.

For instance, when the second ID search engine 300-2B gets (i.e., succeeds in searching for) the URL MS_URL of the management system 400 corresponding to the NFC tag ID TID or the beacon ID BID, the second ID search engine 300-2B may send a search result, i.e., a success value (e.g., the URL MS_URL of the management system 400) to the application program App.

Although three ID search engines are illustrated in FIG. 6 for convenience' sake of the description, the system illustrated in FIG. 6 may use two ID search engines or at least four ID search engines. The application program App that can perform the method according to some embodiments of the present invention may be downloaded from an app store to an IoT device and executed in the IoT device.

As described above, the management system 400 can manage a plurality of web pages (or web sites) using a single tag ID or a single beacon ID.

For instance, when the management system 400 assigns the web page URL WP_URL provided for the mobile terminal 200 to a first web page (or a first web site) for an advertisement and then advertisement duration of the first web page expires, the management system 400 may reassign the web page URL WP_URL provided for the mobile terminal 200 to a second web page (or a second web site) for another advertisement. At this time, the mobile terminal 200 may access the second web page instead of the first web page.

Accordingly, the management system 400 brings such an effect as changing the URL of a web page that the mobile terminal 200 accesses without changing an NFC tag or a beacon.

Figure 7:
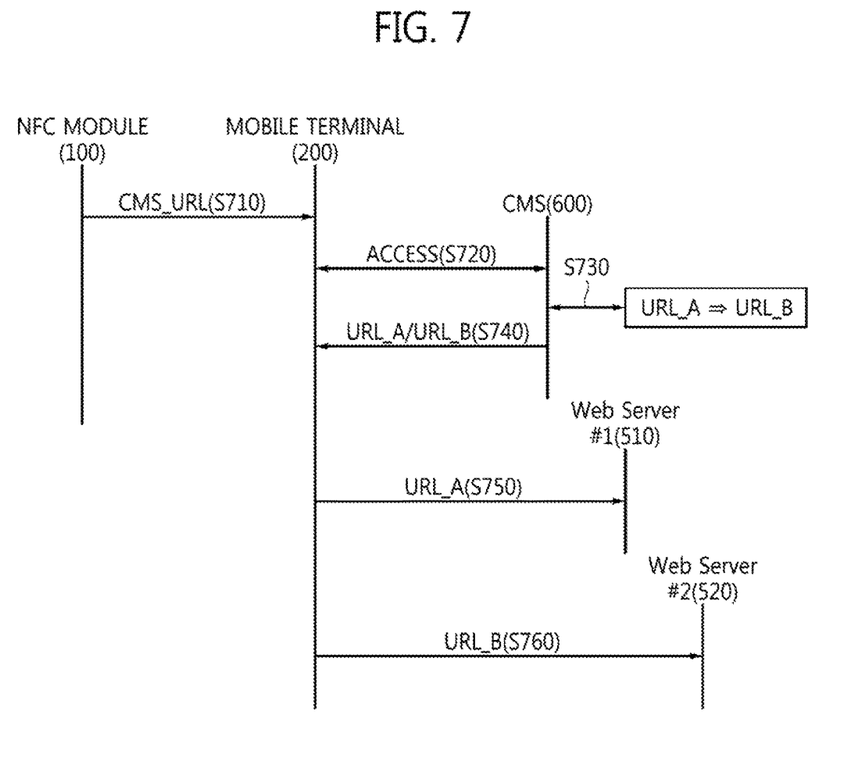
FIG. 7 is a diagram of data flow for explaining the operation of a system according to some embodiments of the present invention.

FIG. 7 is a diagram of data flow for explaining the operation of a system according to some embodiments of the present invention. Referring to FIG. 7, the system includes the NFC module 100, the mobile terminal 200, a content management system (CMS) 600, and a plurality of web servers 510 and 520.

The NFC module 100 may be a module including an NFC function. For instance, the NFC module 100 may be implemented as an NFC tag and may store a URL CMS_URL corresponding to or for accessing the CMS 600.

The mobile terminal 200 includes a transceiver module which can perform an NFC function. The mobile terminal 200 may be implemented as a smartphone, a tablet PC, a MID, an internet tablet, a digital camera, or a wearable computer.

A mobile application which provides a web server access service, which will be described below, is installed in the mobile terminal 200. The mobile application may be executed by a user before operation S710 or may be automatically executed as operation S710 is performed.

When a user tags the NFC module 100 installed in a certain place using the mobile terminal 200, the URL CMS_URL stored in the NFC module 100 is transmitted to the mobile terminal 200 through NFC in operation S710. The mobile terminal 200 accesses a server, i.e., the CMS 600, which corresponds to the URL CMS_URL transmitted from the NFC module 100, through a wireless communication network or a wireless internet network using the mobile application in operation S720.

Thereafter, the CMS 600 reads out a final destination URL URL_A from a database in operation S730 and transmits the final destination URL URL_A to the mobile terminal 200 through a wireless communication network or a wireless internet network in operation S740.

The mobile terminal 200 accesses the first web server 510 corresponding to the final destination URL URL_A using the mobile application in operation S750. Accordingly, the mobile terminal 200 of the user is able to access a web site provided by the first web server 510 using the mobile application.

A method of allowing a user to access the second web server 520 using the URL CMS_URL stored in the NFC module 100 and a mobile application installed in the mobile terminal 200 after a final destination URL is changed from URL_A into URL_B by the CMS 600 will be described. When the user tags the NFC module 100 using the mobile terminal 200, the URL CMS_URL stored in the NFC module 100 is transmitted to the mobile terminal 200 through NFC in operation S710.

The mobile terminal 200 accesses a server, i.e., the CMS 600, which corresponds to the URL CMS_URL transmitted from the NFC module 100, through a wireless communication network or a wireless internet network using the mobile application in operation S720. The CMS 600 reads out the changed final destination URL URL_B from the database in operation S730 and transmits the final destination URL URL_B to the mobile terminal 200 in operation S740.

The mobile terminal 200 accesses the second web server 520 corresponding to the final destination URL URL_B using the mobile application in operation S750. Accordingly, the mobile terminal 200 of the user is able to access a web site provided by the second web server 520 using the mobile application.

Consequently, in a service according to some embodiments of the present invention or a system providing the service, the mobile terminal 200 can access a web server corresponding to a final destination URL using the final destination URL provided from the CMS 600 without a URL initially written to the NFC module 100 being changed or without the NFC module 100 being replaced to change the URL to access the CMS 600.

Figure 8:
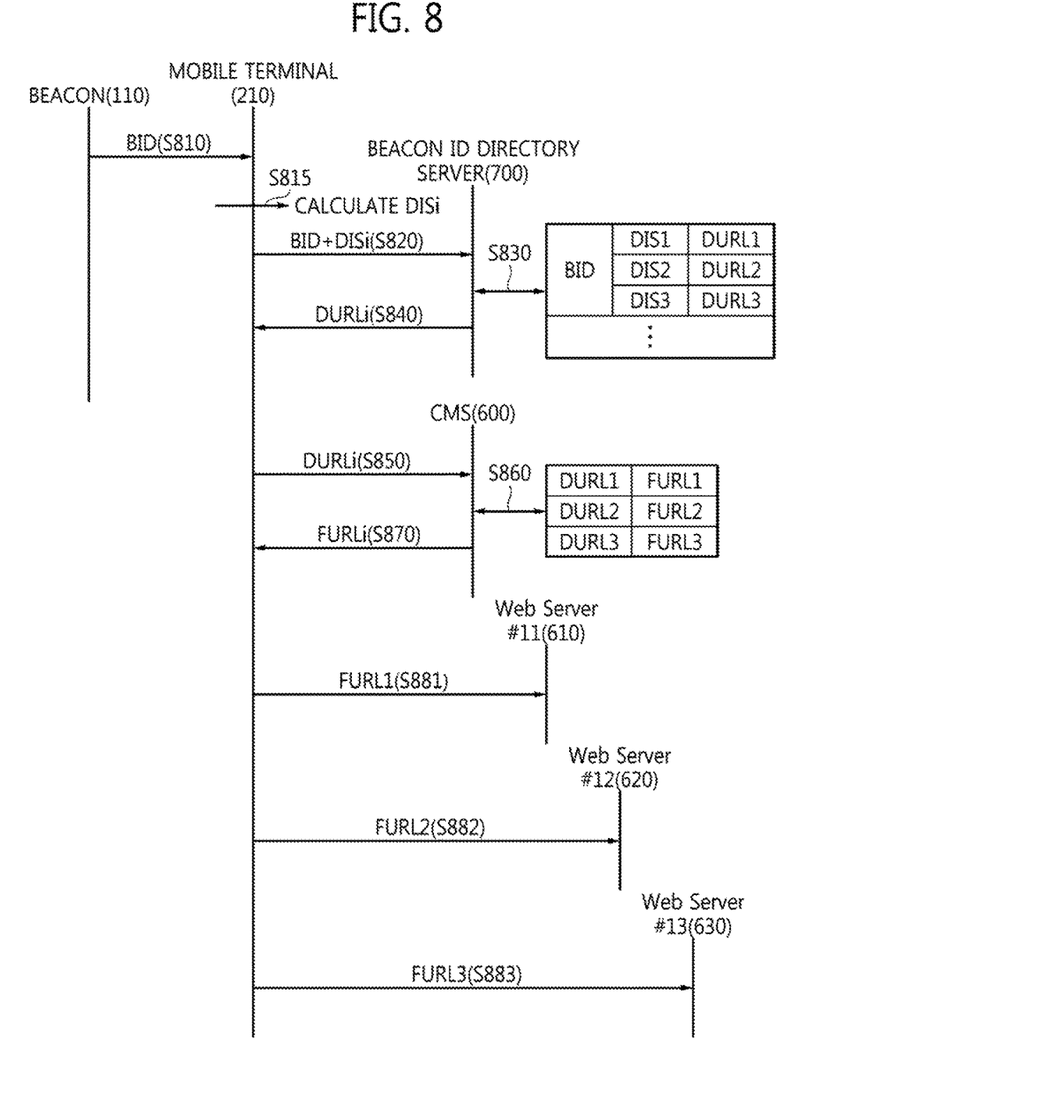
FIG. 8 is a diagram of data flow for explaining the operation of a system according to other embodiments of the present invention.

FIG. 8 is a diagram of data flow for explaining the operation of a system according to other embodiments of the present invention. The system includes the beacon 110, a mobile terminal 210, a beacon ID directory server 700, the CMS 600, and a plurality of web servers 610, 620, and 630.

The beacon 110 may be a device for data communication using BLE. For instance, unlike NFC which requires a mobile terminal (e.g., a smartphone) to be tagged in a close proximity to an NFC module, the beacon allows data to be transmitted to the mobile terminal even when the mobile terminal just passes by a place where the beacon is installed. For instance, the beacon refers to hardware or hardware module for communication using WPAN or IrDA.

For instance, WPAN includes BLUETOOTH, ZIGBEE, or UWB.

A mobile application installed in the mobile terminal 210 may receive a beacon signal including a beacon ID BID from the beacon 110 in operation S810 and may calculate a distance DISi between the beacon 110 and the mobile terminal 210 based on the beacon signal in operation S815.

For instance, the mobile application installed in the mobile terminal 210 may receive the beacon signal, which is output from the beacon 110 and includes the beacon ID BID, and may calculate the distance DISi using the strength of the beacon signal in operation S815. For instance, the mobile application installed in the mobile terminal 210 may calculate the distance DISi between the beacon 110 and the mobile terminal 210 using received signal strength indication (RSSI) in operation S815.

The distance DISi may be calculated in numeral or numerical value or in phase indicating a relative distance such as a long, moderate or short distance.

The mobile application installed in the mobile terminal 210 may transmit a directory request including the beacon ID BID and the distance DISi to the beacon ID directory server 700 in operation S820. The beacon ID directory server 700 may selectively read out an intermediate URL DURLi (where i=1, 2, or 3) from a database using the beacon ID BID and the distance DISi in operation S830. For instance, even with the same beacon ID BID, a different intermediate URL DURLi (where i=1, 2, or 3) may be selected by the beacon ID directory server 700 according to the distance DISi (where i=1, 2, or 3).

The intermediate URL DURLi may be a URL corresponding to the CMS 600. For instance, a first intermediate URL DURL1 may be a first URL for accessing a first directory (or a first web page) of the CMS 600, a second intermediate URL DURL2 may be a second URL for accessing a second directory (or a second web page) of the CMS 600, and a third intermediate URL DURL3 may be a third URL for accessing a third directory (or a third web page) of the CMS 600. In other words, each intermediate URL DURLi may be an URL for accessing a file apart from a directory or page of the CMS 600. For instance, the intermediate URL DURLi may be updated or changed by the beacon ID directory server 700.

The beacon ID directory server 700 transmits the selected intermediate URL DURLi to the mobile terminal 210 in operation S840. The mobile terminal 210 transmits the intermediate URL DURLi from the beacon ID directory server 700 to the CMS 600 using the mobile application in operation S850. The CMS 600 reads out a final destination URL FURLi corresponding to the intermediate URL DURLi from a database in operation S860.

For instance, when the first intermediate URL DURL1 is selected based on the beacon ID BID and a first distance DIS1, the CMS 600 transmits a first final destination URL FURL1 corresponding to the first intermediate URL DURL1 to the mobile terminal 210 through a wireless communication network or a wireless internet network in operation S870. Accordingly, the mobile terminal 210 is able to access a web site corresponding to the first web server 610 using the mobile application in operation S881.

When the second intermediate URL DURL2 is selected based on the beacon ID BID and a second distance DIS2, the CMS 600 transmits a second final destination URL FURL2 corresponding to the second intermediate URL DURL2 to the mobile terminal 210 in operation S870. Accordingly, the mobile terminal 210 is able to access a web site corresponding to the second web server 620 using the application in operation S882.

When the third intermediate URL DURL3 is selected based on the beacon ID BID and a third distance DIS3, the CMS 600 transmits a third final destination URL FURL3 corresponding to the third intermediate URL DURL3 to the mobile terminal 210 in operation S870. Accordingly, the mobile terminal 210 is able to access a web site corresponding to the third web server 630 using the application in operation S883. The mapping relationship between the intermediate URLs DURL1, DURL2, and DURL3 and the final destination URLs FURL1, FURL2, and FURL3 may be updated or changed by the CMS 600.

The mobile application that has been described above may be executed by a user or may be automatically executed in response to the URL CMS_URL output from the NFC module 100 or in response to a beacon signal output from the beacon 110.

As described above with reference to FIG. 8, when the intermediate URL DURLi stored in the beacon ID directory server 700 or the final destination URL FURLi of the CMS 600 is changed, the mobile application installed in the mobile terminal 210 can access a web server corresponding to a changed final destination URL.

A mobile application according to some embodiments of the present invention may perform one or two methods among the methods described with reference to FIGS. 7 and 8.

The mobile application may be downloaded to the mobile terminal 200 or 210 from an app store through a wireless communication network or a wireless internet network and may be installed in the mobile terminal 200 or 210. The app store may include a recording medium, e.g., a database, which can store the mobile application.

Figure 9:
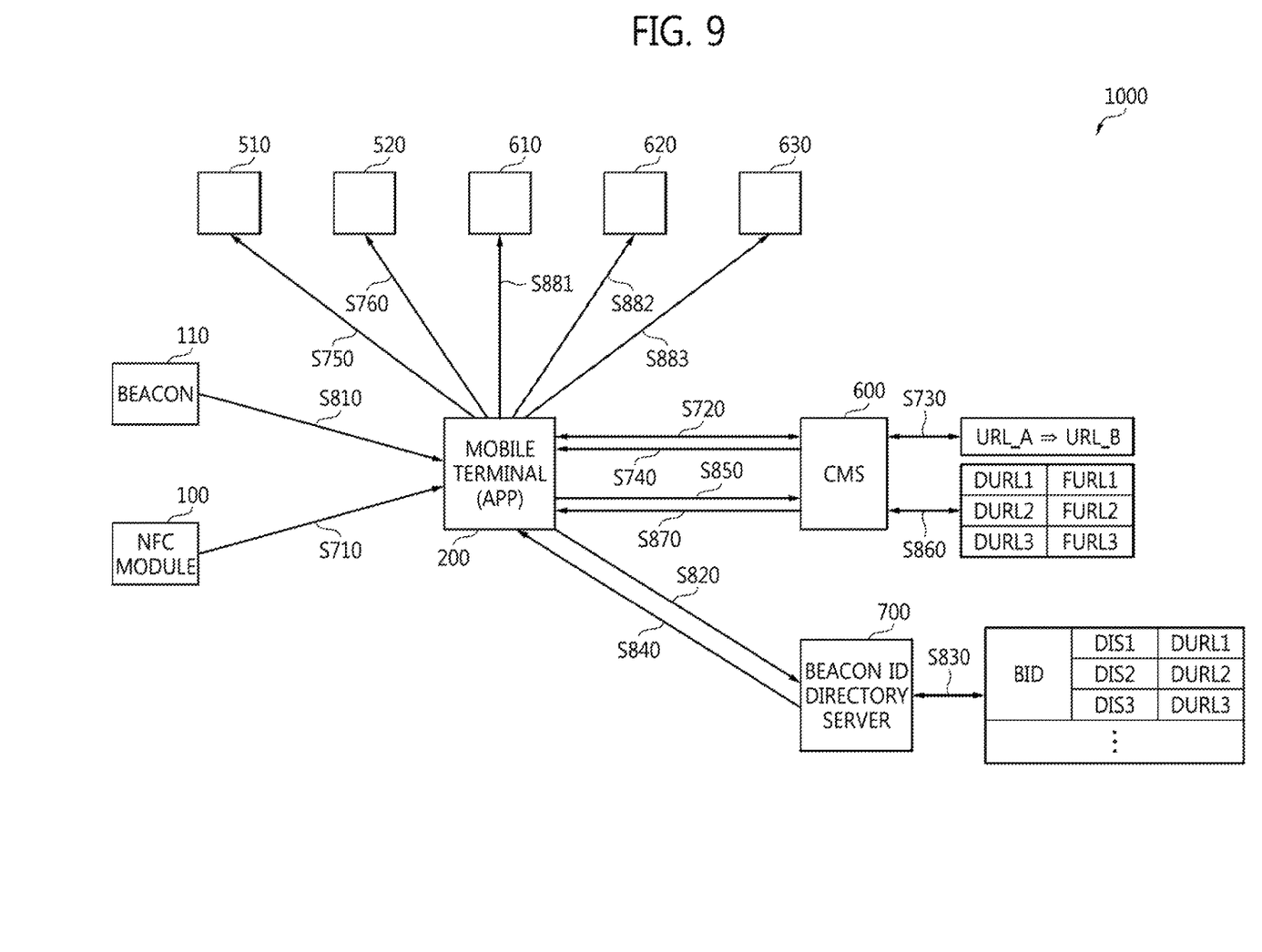
FIG. 9 is a diagram of data flow for explaining the operation of a system according to still other embodiments of the present invention.

FIG. 9 is a diagram of data flow for explaining the operation of a system 1000 according to still other embodiments of the present invention. Referring to FIG. 9, the system 1000 is an example in which the system described with reference to FIG. 7 and the system described with reference to FIG. 8 are combined. At this time, the mobile terminals 200 and 210 may be the same mobile terminal.

For instance, when both the NFC module 100 and the beacon 110 are installed in a certain space, the mobile terminal 200 can access a web server corresponding to a particular final destination URL using the CMS 600 and a mobile application APP.

In other words, the mobile terminal 200 can access one of the web servers 510, 520, 610, 620, and 630 using the mobile application APP according to how the URLs URL_A and URL_B are set and how the URLs FURL1, FURL2, and FURL3 are set.

The final destination URL (i.e., URL_A or URL_B) illustrated in FIG. 7 and the final destination URL (i.e., FURL1, FURL2, or FURL3) illustrated in FIG. 8 may be set as the URL of one web server.

As described above with reference to FIGS. 7 through 9, in a service according to some embodiments of the present invention or a system providing the service, the mobile terminal 200 can access one of the web servers 510, 520, 610, 620, and 630 using the final destination URL URL_A, URL_B, FURL1, FURL2, or FURL3 provided from the CMS 600, (1) without a URL initially written to the NFC module 100 being changed; or (2) without the NFC module 100 being replaced to change the URL to access the CMS 600. For instance, when the mobile terminal 200 receives the URL CMS_URL from the NFC module 100 and a beacon signal from the beacon 110 simultaneously or in parallel, a user may decide which will be executed first using the mobile application APP.

While this invention has been particularly shown and described with reference to preferred embodiments thereof, the scope of the preferred embodiments should not be considered to be limited to the drawings and the description.

It will be understood by those skilled in the art that various changes in form and details may be made therein without departing from the spirit and scope of the invention as defined by the appended claims. Therefore, these various changes will be construed as being included in the scope of the present invention.

The present invention relates to a method of accessing a web server and is applicable to industry related with web server access using an NFC tag or a beacon.

What is claimed is:

1. A method of accessing a web page using a mobile terminal, the method comprising:
   receiving, by the mobile terminal, a first uniform resource locator (URL) from a near field communication (NFC) tag;
   accessing, by the mobile terminal, a management system corresponding to the first URL using the first URL and requesting a second URL from the management system;
   receiving, by the mobile terminal, the second URL from the management system;
   accessing, by the mobile terminal, a first web server corresponding to the second URL using the second URL;
   receiving, by the mobile terminal, the first URL from the NFC tag after the second URL is changed into a third URL by the management system;
   accessing, by the mobile terminal, the management system corresponding to the first URL using the first URL;
   receiving, by the mobile terminal, the third URL from the management system; and
   accessing, by the mobile terminal, a second web server corresponding to the third URL using the third URL provided from the management system without the first URL initially written to the NFC tag being changed or without the NFC tag being replaced to change the first URL to access the management system.

2. The method of claim 1, wherein, when the mobile terminal receives both a tag ID and the first URL from the NFC tag, the requesting of the second URL comprises transmitting the tag ID to the management system with the requesting of the second URL.

3. The method of claim 1, further comprising:
   receiving, by the mobile terminal, a beacon signal comprising a beacon ID from a beacon;
   calculating, by the mobile terminal, a distance between the beacon and the mobile terminal based on strength of the beacon signal;
   transmitting, by the mobile terminal, the beacon ID and the calculated distance to a beacon ID directory server;
   receiving, by the mobile terminal, an intermediate URL from the beacon ID directory server;
   accessing, by the mobile terminal, the management system corresponding to the intermediate URL;
   receiving, by the mobile terminal, a final destination URL from the management system; and
   accessing, by the mobile terminal, a third web server corresponding to the final destination URL,
   wherein the intermediate URL is selected based on the beacon ID and the calculated distance.

4. A non-transitory computer readable medium comprising a computer program executable by a processor of the mobile terminal, the computer program implementing the method of claim 1 upon execution by the mobile terminal.

5. A method of accessing a web server using a mobile terminal, the method comprising:
   receiving, by the mobile terminal, a beacon signal comprising a beacon ID from a beacon;
   calculating, by the mobile terminal, a distance between the beacon and the mobile terminal based on strength of the beacon signal;
   transmitting, by the mobile terminal, the beacon ID and the calculated distance to a beacon ID directory server;
   receiving, by the mobile terminal, an intermediate uniform resource locator (URL) from the beacon ID directory server;
   accessing, by the mobile terminal, a content management system corresponding to the intermediate URL;
   receiving, by the mobile terminal, a final destination URL from the content management system; and
   accessing, by the mobile terminal, a first web server corresponding to the final destination URL.

6. The method of claim 5, wherein the intermediate URL is selected based on the beacon ID and the calculated distance.

7. The method of claim 5, further comprising:
receiving, by the mobile terminal, a first URL from a tag;
accessing, by the mobile terminal, the content management system corresponding to the first URL;
receiving, by the mobile terminal, a second URL from the content management system; and
accessing, by the mobile terminal, a second web server corresponding to the second URL.

8. A non-transitory computer readable medium comprising a computer program executable by a processor of the mobile terminal, the computer program implementing the method of claim 5 upon execution by the mobile terminal.

9. A method of accessing a web page using a mobile terminal, the method comprising:
receiving, by the mobile terminal, a first uniform resource locator (URL) of a management system from a beacon;
accessing, by the mobile terminal, the management system using the first URL of the management system and requesting a second URL from the management system,
wherein the second URL is assigned by the management system to a first web page for an advertisement during an advertisement duration and the second URL is reassigned by the management system to a second web page for another advertisement after the advertisement duration expires;
receiving, by the mobile terminal, the second URL from the management system; and
accessing, by the mobile terminal, the first or second web page using the second URL.

10. The method of claim 9, wherein when the mobile terminal receives both a beacon ID and the first URL from the beacon, the requesting the second URL comprises transmitting the beacon ID to the management system together with the request.

11. A non-transitory computer readable medium comprising a computer program executable by a processor of the mobile terminal, the computer program implementing the method of claim 9 upon execution by the mobile terminal.

* * * * *